United States Patent
Takagi

(10) Patent No.: US 6,556,636 B1
(45) Date of Patent: Apr. 29, 2003

(54) DIGITAL COMMUNICATION APPARATUS HAVING LEVEL CONTROLLER WITH A DISTURBANCE DETECTION UNIT

(75) Inventor: Kotaro Takagi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/127,974

(22) Filed: Aug. 3, 1998

(30) Foreign Application Priority Data

Aug. 5, 1997 (JP) ............................................. 9-210280
Mar. 17, 1998 (JP) ........................................... 10-066739

(51) Int. Cl.[7] ................................................ H04B 3/04
(52) U.S. Cl. ....................... 375/350; 375/345; 375/346; 375/230
(58) Field of Search ................................ 375/316, 346, 375/350, 230, 345

(56) References Cited

U.S. PATENT DOCUMENTS 5,978,415 A * 11/1999 Kobayashi et al. ......... 375/230

* cited by examiner

Primary Examiner—Chi Pham
Assistant Examiner—Pankaj Kumar
(74) Attorney, Agent, or Firm—Jay H. Maioli

(57) ABSTRACT

A digital communication apparatus in which a QPSK signal is received and frequency-converted to an intermediate frequency signal, the intermediate frequency signal is subjected to A/D conversion and separation into an I-component and a Q-component to obtain I-component and Q-component digital data, and the original digital data is obtained from the I-component and Q-component digital data. The digital commumication apparatus has an A/D converter circuit for performing the above-mentioned A/D conversion, a level control circuit for controlling the level of a signal supplied to the A/D converter circuit to a predetermined value, and a disturbance signal level detection circuit for detecting the disturbance signal level contained in the received signal.

3 Claims, 5 Drawing Sheets

DIGITAL COMMUNICATION APPARATUS HAVING LEVEL CONTROLLER WITH A DISTURBANCE DETECTION UNIT

BACKGROUND OF THE INVENTION

1. Field of the Invention

This invention relates to a digital communication receiving apparatus used suitably for a digital audio broadcast receiving apparatus.

2. Description of Related Art

DAB (digital audio broadcasting) has been known as a digital communication using phase modulation. The DAB is practically used according to EUREKA 147 standard in Europe, the signal processing on the transmission side is described herein under.

(1) A digital audio data having the maximum of 64 channels is compressed according to the MPEG audio layer II for every channel.

(2) Each channel data resulted from the above-mentioned (1) is subjected to error correction encode processing by convolution coding and interleaving of the time axis.

(3) The result of the above-mentioned (2) is multiplexed to one channel. When, auxiliary data such as PAD is added.

(4) The result of the above-mentioned (3) is subjected to interleave processing on the frequency axis and a symbol for synchronization is added simultaneously.

(5) The result of the above-mentioned (4) is subjected to OFDM (Orthogonal Frequency Division Multiplex) processing and subsequently subjected to D/A conversion.

(6) The main carrier signal is subjected to QPSK modulation (Quadrature Phase Shift Keying) depending on the result of the above-mentioned (5), and the QPSK signal is transmitted.

The DAB receiving apparatus may therefore have the structure as shown in FIG. 3, for example.

In detail, in FIG. 3, an antenna 11 receives a DAB broadcast wave signal, the received signal is supplied to a mixer circuit 15 through a signal line comprising, in the order of passing, a band pass filter 12, a high frequency amplifier 13, and bandpass filter 14, and a local oscillation circuit 16 supplies a local oscillation signal having the predetermined frequency which is variable depending on the received frequency to the mixer circuit 15, and the received signal is subjected to frequency conversion and converted to an intermediate frequency signal SIF having a predetermined frequency.

The intermediate frequency signal SIF is supplied to the mixer circuits 21I and 21Q through a band pass filter 17 for intermediate frequency filtration and amplifier 18 for intermediate frequency amplification. A local oscillation circuit 22 generates a local oscillation signal having a frequency equal to the intermediate frequency of the intermediate frequency signal SIF and having a phase which is different by 90 degrees from that of the intermediate frequency signal SIF, and the local oscillation signal is supplied to the mixer circuits 21I and 21Q. As described herein above, in the mixer circuit 21I and 21Q, the intermediate frequency signal SIF is subjected to frequency conversion and the intermediate frequency signal SIF is converted to an I signal SI and a Q signal SQ, and the signals SI and SQ are outputted.

The signals SI and SQ are supplied to gain control amplifiers 23I and 23Q, in which the signals SI and SQ are converted to signals Si and Sq having a predetermined level, and these signals Si and Sq are supplied to A/D converter circuits 24I and 24Q and converted to digital data DI and DQ. The data DI and DQ are supplied to an FFT (Fast Fourier Transform) circuit 31 through digital low-pass filters 25I and 25Q described herein after and subsequently through amplifiers 26I and 26Q and are subjected to OFDM demodulation, and the OFDM demodulated data is supplied to a Viterbi decoder circuit 32, in which deinterleaving and error correction are performed and a program (channel) is selected, and thus the digital audio data of the desired program is selected.

Subsequently, the selected data is supplied to an expansion circuit 33, in which MPEG data expansion is performed, the data expansion circuit 33 expands the digital audio data of the desired program to the data having the original data length and outputs it, the outputted digital audio data is supplied to a D/A converter circuit 34, in which the digital audio data is subjected to D/A conversion and is converted to an analog audio signal, and the signal is outputted to a terminal 35.

At this time, a programmable gain control amplifier which is capable of gain controlling with a digital control signal is used as the variable gain amplifiers 23I and 23Q. The signal DI and DQ from the amplifiers 26I and 26Q are supplied to level detection circuits 27I and 27Q, in which the signal level (the signal level obtained when the signal DI and DQ are D/A converted) of the signal DI and DQ is detected, the detected outputs are supplied to the gain control amplifiers 23I and 23Q as a gain control signal, and the signal SI and SQ supplied to the A/D converter circuits 24I and 24Q are controlled to a predetermined constant level.

Accordingly, the signal level of the signals SI and SQ to be supplied to the A/D converter circuits 24I and 24Q is maintained at a constant level which matches to the dynamic range of the A/D converter circuits 24I and 24Q even though the received signal level from the antenna 11 changes, and thus the signals SI and SQ are A/D converted correctly to the data DI and DQ.

The above-mentioned description is the outline of the DAB receiving apparatus.

In the conventional receiving apparatus described herein above, the digital low-pass filters 25I and 25Q are provided to compensate the band pass filter 17 for processing.

For example, as shown in FIG. 4A, if there is a disturbance signal SUD at a frequency (fD+Δf) near the broadcast wave signal SD (center frequency fD) desired to be received, for example as shown in FIG. 4B, the output signal from the mixer circuit 15 contains undesirably the signal component SIFUD which is resulted from the disturbance signal SUD through frequency conversion at the frequency (fIF+Δf) in the case of down heterodyne conversion in addition to the intermediate frequency signal SIF (center frequency of fIF) which is resulted from the desired wave signal SD through frequency conversion.

The inclusion of the disturbance component SIFUD in the output signal from the mixer circuit 15 as described herein above results in undesirably inclusion of the signal component SBBUD as shown in FIG. 4C generated from the disturbance component SIFUD through frequency conversion at the position of frequency Δf in addition to the I signal SI and Q signal SQ of the base band, and the disturbance component SBBUD affects adversely following data processing as a matter of course.

To remove the disturbance component SIFUD contained in the output signal from the mixer circuit 15, the band pass filter 17 having a passing characteristic as shown with a dashed line in FIG. 4B is provided on the step next to the mixer circuit 15 as described herein above.

However, the band pass filter is an analog circuit, therefore the center frequency and passing characteristic disperse. It is difficult to prescribe the temperature characteristic to a desired characteristic. Depending on the model, because the intermediate frequency fIF of the intermediate frequency signal SIF usually is in a range as high as from several ten MHz to several hundred MHz, if the disturbance signal SUD has a frequency near that of the intermediate frequency signal SIF, the dispersion becomes the more significant. Even if the band pass filter 17 were prescribed to a desired characteristic, such transmission receiving apparatus is disadvantageous in that parts cost is high and the apparatus size is large.

Because the band pass filter 17 can not remove the disturbance component SIFUD sufficiently, the digital low-pass filters 25I and 25Q are provided to remove the disturbance component SBBUD. In this case, because the low-pass filters 25I and 25Q comprise a digital circuit, required characteristic is obtained easily and stably. Further, the frequency of the I signal SI and Q signal SQ is low and, the disturbance component SBBUD is easily removed even if the frequency of the disturbance component SBBUD is near.

As described herein above, the processing performed by the band pass filter 17 is compensated by the digital low-pass filters 25I and 25Q, and the data DI and DQ from which the disturbance component SBBUD is sufficiently reduced is supplied to the FFT circuit 31.

However, to compensate the band pass filter 17 for the processing with the digital low-pass filters 25I and 25Q, A/D converter circuits having a wide dynamic range are required as the A/D converter circuits 24I and 24Q.

In detail, though C/N required to receive the signals SI and SQ is different depending on the communication system, it is assumed that 25 dB is required. As shown in FIG. 4A, it is assumed that the level of the disturbance signal SUD is higher than that of the desired signal by 30 dB. Because the level of the desired signal SD changes rapidly due to fading in an actual mobile communication, the dynamic range of the A/D converter circuits 24I and 24Q needs the margin more. It is assumed that the margin of 20 dB is required.

As shown in FIG. 5A, the A/D converter circuits 24I and 24Q need the dynamic range of at least 75 dB(=30 dB+25 dB+20 dB). To obtain the dynamic range of 75 dB, the A/D converter circuits 24I and 24Q need the number of bits of at least 13 bits.

However, if the disturbance component SIFUD is sufficiently reduced in the band pass filter 17, the dynamic range of 45 dB namely sum of C/N of 25 dB and fading margin of 26 dB is sufficient for the A/D converter circuits 24I and 24Q as shown in FIG. 4B, and the number of 8 bits is sufficient for the A/D converter circuits 24I and 24Q.

To sum up, to compensate the band pass filter 17 for the characteristic with the digital low-pass filters 25I and 25Q, the A/D converter circuits 24I and 24Q having a large number of quantization bits are required and, this method is not preferable because of high power consumption and high cost. To reduce the number of quantization bits of the A/D converter circuits 24I and 24Q, the bandpass filter of high performance is required and, this method is also not preferable because of high cost and large occupied space.

A system which is tested by adding a disturbance signal SUD having a level higher than a desired signal SD by 79 dB as GSM requires not only digital low-pass filters 25I and 25Q but also a filter to reduce the level of the disturbance signal SUD by 50 dB or more, for example, SAW filter. Such filter is expensive and large sized.

SUMMARY OF THE INVENTION

The present invention is accomplished to solve the problem described herein above.

In the present invention, the communication receiving apparatus for digital communication in which the frequency of received QPSK signal is converted to generate an intermediate frequency signal, the intermediate frequency signal is subjected to A/D conversion and I-component/Q-component separation to obtain I-component digital data and Q-component digital data, and the original digital data is obtained from the I-component digital data and the Q-component digital data has:

an A/D converter circuit for performing the A/D conversion;

a level control circuit for controlling the level of the signal supplied to the A/D converter circuit to a predetermined value; and a detection circuit for detecting the level of a disturbance signal contained in the received signal;

wherein the reference level of the signal is controlled based on the output from the detection circuit correspondingly to the level of the disturbance signal so that the level of the signal supplied from the level control circuit to the A/D converter circuit ranges within the dynamic range of the A/D converter circuit.

The reference level of the signal supplied to the A/D converter circuit is therefore controlled to the level matched to the dynamic range of the A/D converter circuit, and then the signal is subjected to A/D conversion.

DETAILED DESCRIPTION OF THE PREFERRED EMBODIMENTS

Figure 1:
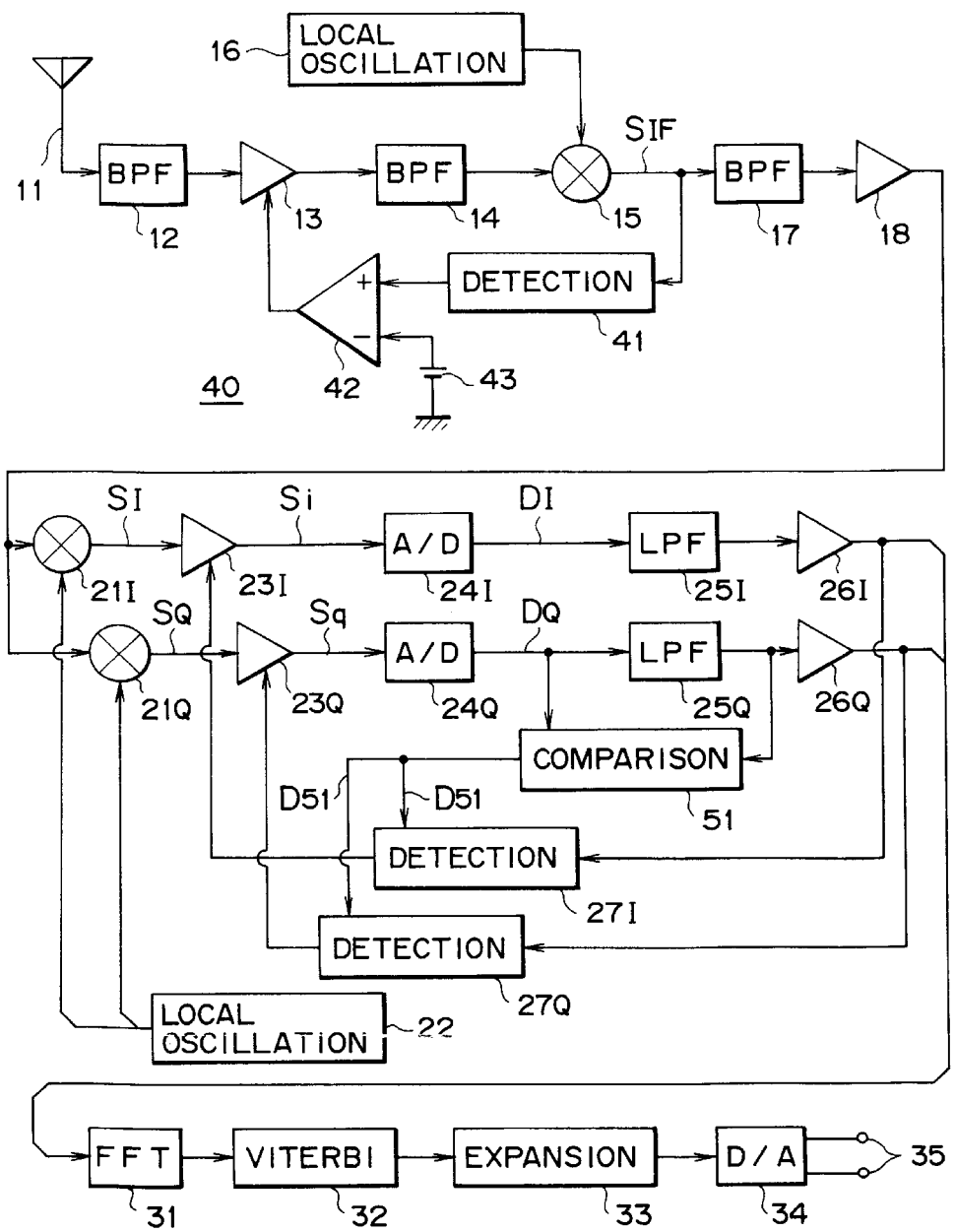
FIG. 1 is a system diagram for illustrating one embodiment of the present invention

In FIG. 1, broadcast wave signal of DAB is received by an antenna 11, the received signal is supplied to a mixer circuit 15 through a signal line comprising a band pass filter 12, high frequency amplifier 13, and band pass filter 14, local oscillation signal having a predetermined frequency which varies correspondingly to the received frequency is supplied from a local oscillation circuit 16 to the mixer circuit 15, and the received signal is subjected to frequency conversion to be converted to an intermediate frequency SIF having a predetermined frequency.

Further, a delay AGC circuit 40 is provided. In detail, the intermediate frequency signal SIF from the mixer circuit 15 is supplied to a level detection circuit 41 and a level detection voltage of the signal SIF is outputted, the detection voltage is supplied to a voltage comparison circuit 42 to compare the voltage with a reference voltage from a voltage source 43 and, the comparison voltage is supplied to the amplifier 13 as a bias control signal. When the level of a received signal exceeds the reference reception level, the bias of the amplifier 13 is controlled so as to suppress the distortion of the amplifier due to an excessively high level input and also to prevent the supply of an excessively high level input to the mixer circuit 15 and following devices.

The intermediate frequency signal SIF from the mixer circuit 15 is supplied to mixer circuits 21I and 21Q though a band pass filter 17 for intermediate frequency filtration and an amplifier 18 for intermediate frequency amplification. The band pass filter 17 may not have a function to remove the disturbance signal SUD sufficiently.

In a local oscillation circuit 22, a local oscillation signal having a frequency equal to the intermediate frequency of the intermediate frequency signal SIF and having a phase different by 90 degrees is generated and, the local oscillation signal is supplied to the mixer circuits 21I and 21Q. As described herein above, the mixer circuits 21I and 21Q convert the frequency of the intermediate frequency signal SIF to generate I signal SI and Q signal SQ having a base band, and these signals SI and SQ are outputted.

The signals SI and SQ are supplied to gain control amplifiers 23I and 23Q, in which the signals SI and SQ are converted to signals Si and Sq having a predetermined level, and these signals Si and Sq are supplied to A/D converter circuits 24I and 24Q and converted to digital data DI and DQ. The signals SI and SQ are supplied to A/D converter circuits 24I and 24Q through gain control amplifiers 23I and 23Q for level controlling, and A/D converted to digital data DI and DQ. The data DI and DQ are supplied to an FFT circuit 31 through digital low-pass filters 25I and 25Q and then amplifiers 26I and 26Q for OFDM demodulation, the OFDM modulated data is supplied to a Viterbi decoder circuit 32 for deinterleaving and error correction, and a program (channel) is selected to select a digital audio data of a desired program.

Subsequently, the selected data is supplied to a data expansion circuit 33 for performing MPEG data expansion, the data expansion circuit 33 outputs the digital audio data of the desired program having the original data length, the outputted digital audio data is supplied to a D/A converter circuit 34 for D/A conversion to an analog audio data, and the signal is outputted to the terminal 35.

When, the signals DI and DQ from the amplifiers 26I and 26Q are supplied to level detection circuits 27I and 27Q and the signals level (the signal level obtained when the signals DI and DQ are D/A converted) which the signals DI and DQ indicate is detected, the detected output is supplied to the gain control amplifiers 23I and 23Q as the control signal of the gain, and the signals Si and Sq supplied to the A/D converter circuit 24I and 24Q are controlled at a predetermined constant level.

The A/D converter circuits 24I and 24Q are of, for example, the number of bits of 10, therefore the dynamic range is 60 dB. The digital low-pass filters 25I and 25Q have a passing characteristic to remove the disturbance component sufficiently.

Further, a signal supplied from any one of A/D converter circuits 24I and 24Q, for example, the digital signal DQ supplied from the A/D converter circuit 24Q to the digital low-pass filter 25Q is supplied also to the comparison circuit 51, the digital signal DQ outputted from the digital low-pass filter 25Q is supplied to a data comparison circuit 51, and the difference D51 between both signals DI and DQ is outputted as a comparison output.

Therefore, assuming that;
data D24 is a signal DQ inputted to the filter 25Q and
data D25 is a signal DQ outputted from the filter 25Q, then D51=D24−D25, if the received signal contains no disturbance signal SUD, D24=D25, accordingly D51=0. However, if the received signal contains some disturbance signal SUD, the data D24 also contains disturbance component but data D25 contains no disturbance component, accordingly D51≠0. In other words, the signal D51 indicates resultingly the level of a disturbance signal SUD contained in the received signal.

The signal D51 is supplied to the level detection circuits 27I and 27Q as a control signal, and the control signal to be supplied to the gain control circuit 23I and 23Q so that the reference level of the signals Si and Sq outputted from the gain control amplifiers 23I an 23Q is controlled to a predetermined level is controlled.

Figure 2:
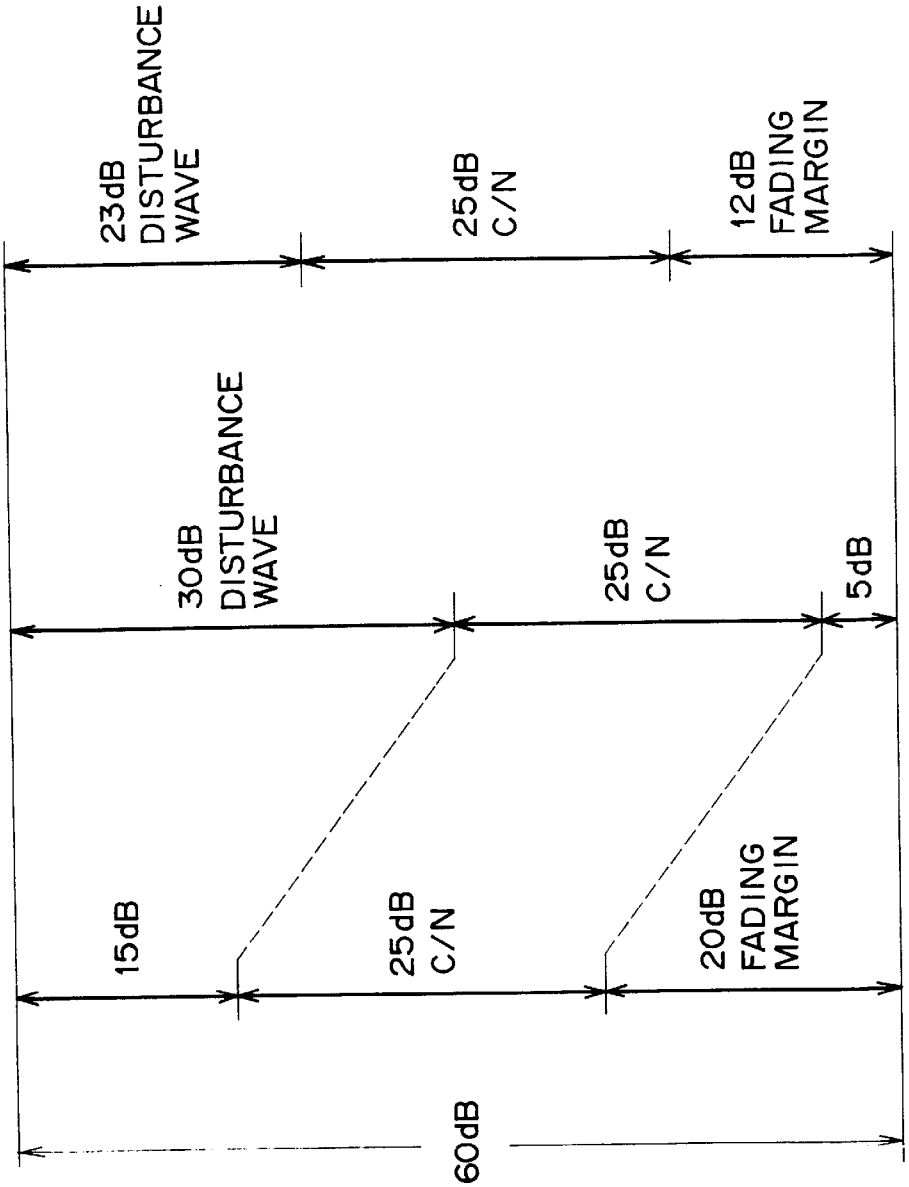
FIGS. 2A to 2C are diagrams for describing the present invention.
Figure 3:
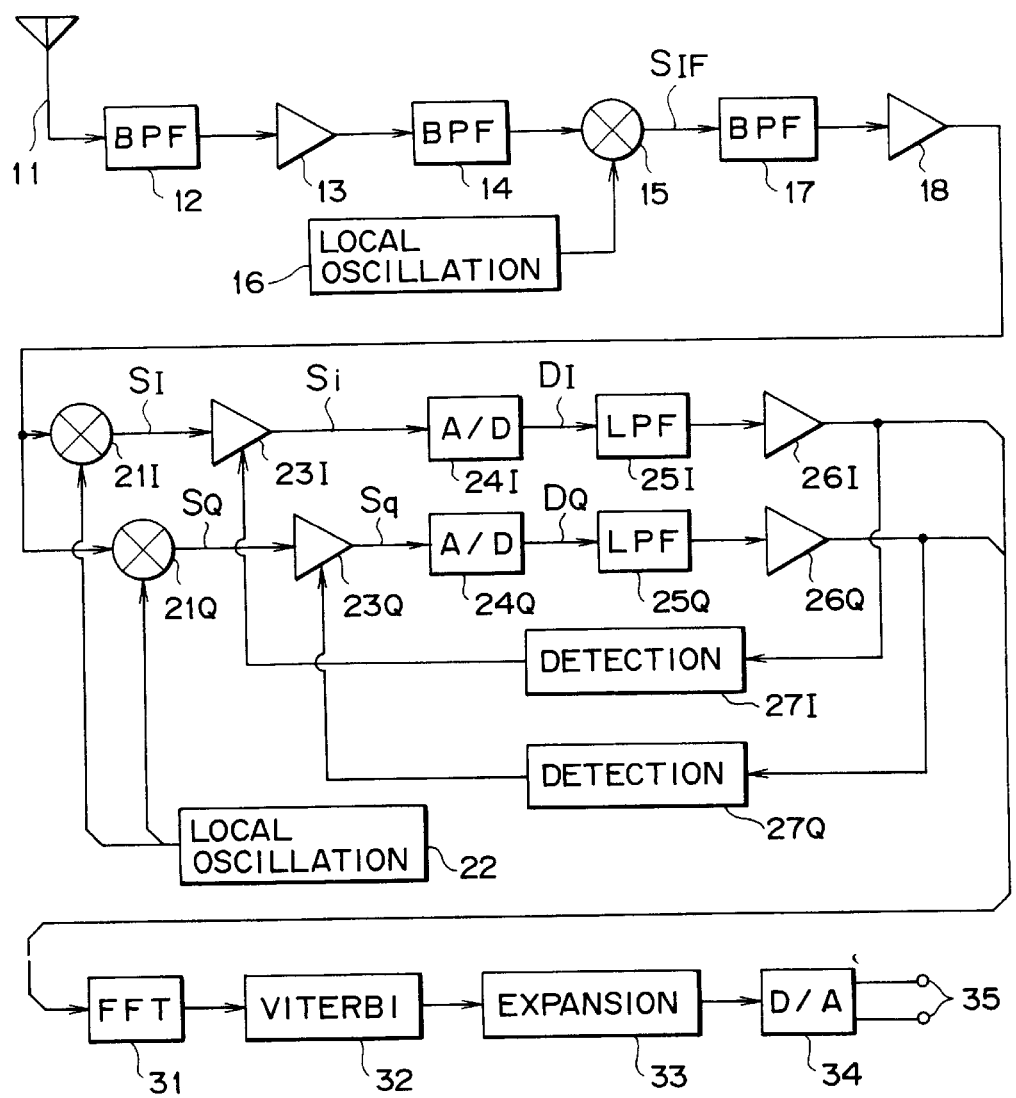
FIG. 3 is a diagram for describing the present invention.
Figure 4A:
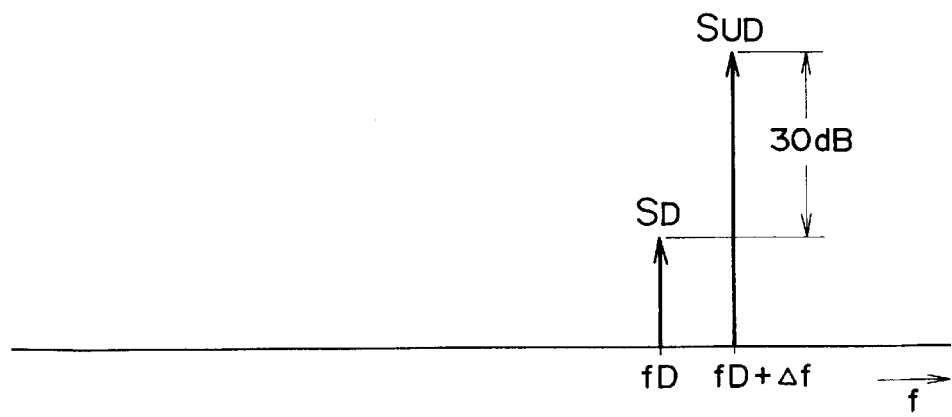
FIGS. 4A to 4C are diagrams for describing the present invention.
Figure 4B:
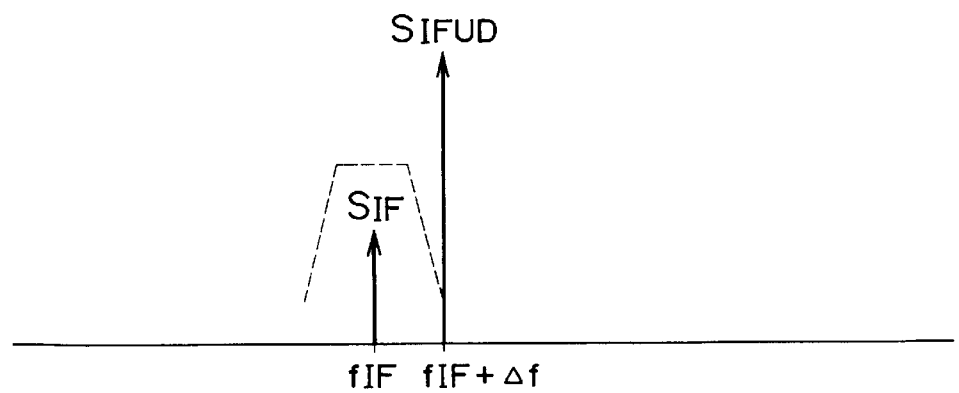
Figure 4C:
Figure 5A:
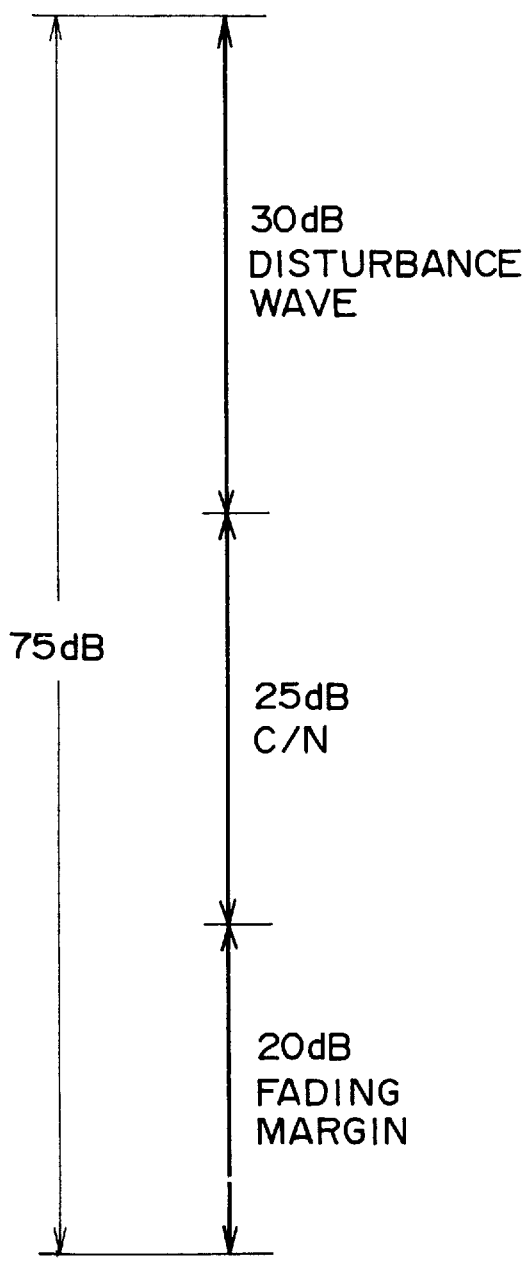
FIGS. 5A and 5B are diagrams for describing the present invention.
Figure 5B:
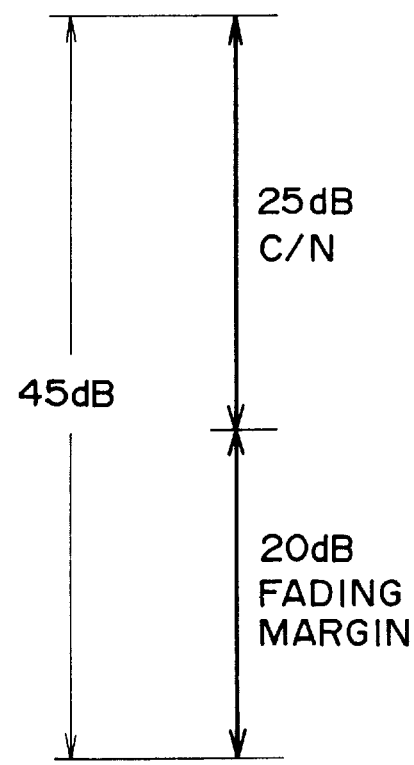

If the received signal contains desired signal SD and no disturbance signal SUD, then D51=0, accordingly the gain of the amplifiers 23I and 23Q is controlled so that the reference level of the signals Si and Sq to be supplied to the A/D converter circuit 24I and 24Q is controlled to, for example, −15 dB with respect to the full scale of the A/D converter circuits 24I and 24Q. The signals Si and Sq having the level distribution as shown in FIG. 2A of the dynamic range of the A/D converter circuits 24I and 24Q is supplied and then the signals Si and Sq can be converted correctly to the signals DI and DQ.

On the other hand, if the received signal contains not only the desired signal SD but also a disturbance signal SUD having a level higher than a predetermined level, for example, a disturbance signal SUD having a level of 30 dB high, then D51>0. To cope with the high disturbance signal SUD, the gain of the amplifiers 23I and 23Q is controlled so that the reference level of the signals Si and Sq to be supplied to the A/D converter circuits 24I and 24Q is controlled to, for example, −30 dB with respect to the full scale of the A/D converter circuit 24I and 24Q as shown in FIG. 2B. The signals Si and Sq having the level distribution as shown in FIG. 2B with respect to the dynamic range of the A/D converters 24I and 24Q is supplied, and then also the signal Si and Sq are A/D converted correctly to signals DI and DQ. When the fading margin becomes 5 dB, it is ignored.

According to the receiving apparatus of the DAB, because the reference level of a signal supplied to the A/D converter circuits 24I and 24Q is controlled correspondingly to the level of a disturbance signal SUD contained in the received signal and, the number of bits of the A/D converter circuits 24I and 24Q can be made as small as, for example, 10 bits, thus the power consumption and cost can be reduced.

Because the number of bits of signals DI and DQ is reduced, the circuit scale for processing these signals DI and DQ can be also reduced. A band pass filter of high performance is not required as the band pass filter 17, such band pass filter provides advantages of low cost and less occupied space on a substrate.

In the above description, the fading margin is ignored when there is a disturbance signal, but when the level of the signal Si and Sq is varied continuously correspondingly to the level of the disturbance SUD, if the level of the disturbance is low, fading margin can be increased by utilizing the level distribution, for example, as shown in FIG. 2C instead of the level distribution as shown in FIG. 2B.

In the above description, for example, if the surplus level of the disturbance signal SUD in the received signal is smaller than +5 dB with respect to the level of the desired signal SD, the reference level of the signals SI and SQ is set to the distribution shown in FIG. 2A, on the other hand, if the surplus level is larger than +5 dB, the reference level of the signals SI and SQ is set to the distribution shown in FIG. 2B. In such way, the reference level of the signals Si and Sq supplied to A/D converter circuits 24I and 24Q may be switched in two steps.

Further, the error rate of the data demodulated from the signals DI and DQ and the received signal level are checked, and if the bit error rate is larger than a specified value though the level of the received signal is large, the received signal is judged to be a received signal which contains a disturbance signal SUD and, the reference level of the signals Si and Sq to be supplied to the A/D converter circuits 24I and 24Q may be changed as described herein above.

When the intermediate frequency signal SIF is A/D converted and the digital intermediate frequency signal is separated into the signals DI and DQ, the level of the intermediate frequency signal is controlled so as to range within the dynamic range of the A/D converter circuit, and the reference level may be controlled as described herein above correspondingly to the level of the disturbance signal SUD.

Further, in the above-mentioned description, the digital processing performed by the A/D converter circuits 24I and 24Q and following downstream devices is performed by the hardware, but alternatively may be performed by the DSP and its software, and such method is more practical.

According to the present invention, because the number of bits of the A/D converter circuit is reduced, the power consumption and cost are reduced. Because the number of bits after A/D conversion is reduced, the scale of circuit for processing data is reduced.

Further, because a band pass filter for intermediate frequency filtration of high performance is not required, the cost and occupied space on a substrate is reduced.

What is claimed is:

1. A communication receiving apparatus for digital communication, wherein a frequency of a received QPSK signal is converted to an intermediate frequency and subjected to separation into an I-component signal and a Q-component signal for obtaining I-component digital data and Q-component digital data, wherein original digital data is obtained from said I-component digital data and said Q-component digital data, said communication receiving apparatus comprising:

variable level control means for controlling a first reference level of the I-component signal and the Q-component signal to a predetermined value;

A/D converter means for converting the I-component signal from the variable level control means into an I-component digital signal and for converting the Q-component signal from the variable level control means into a Q-component digital signal; and disturbance signal level detection means for detecting a second reference level of a disturbance signal contained in said I-component digital signal and said Q-component digital signal, wherein said first reference level of said I-component signal and said Q-component signal is controlled based on an output from detection means included in said disturbance signal level detection means corresponding to said second reference level of said disturbance signal so that said first reference level of said I-component signal and said Q-component signal supplied from said level control means to said A/D converter means is within a dynamic range of said A/D converter means, wherein said disturbance signal level detection means further includes filter means for removing a disturbance component and comparison means for comparing an output of said A/D converter means with an output of said filter means and producing a control signal for controlling said output of said detection means.

2. The communication receiving apparatus as set forth in claim 1, wherein said disturbance signal level detection means includes filter means for removing a disturbance component and comparison means for comparing an output of said A/D converter means with an output of said filter means and producing said output of said disturbance signal level detection means.

3. The communication receiving apparatus as set forth in claim 1, wherein said comparison means produces a first comparison output when said I-component signal and said Q-component signal do not contain said disturbance signal and produces a second comparison output when said I-component signal and said Q-component signal contain said disturbance signal, and one of said first comparison output and said second comparison output is utilized as a control signal of said detection means so that said first reference level of said I-component signal and said Q-component signal supplied to said A/D converter means is said predetermined value.

\* \* \* \* \*